US009418129B2

(12) United States Patent
Cao Minh et al.

(10) Patent No.: US 9,418,129 B2
(45) Date of Patent: Aug. 16, 2016

(54) ADAPTIVE HIGH-PERFORMANCE DATABASE REDO LOG SYNCHRONIZATION

(71) Applicant: Oracle International Corporation, Redwood Shores, CA (US)

(72) Inventors: Chi Cao Minh, San Mateo, CA (US); Vinay H. Srihari, San Mateo, CA (US); Yunrui Li, Fremont, CA (US); Jonghyun Lee, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 222 days.

(21) Appl. No.: 13/791,607

(22) Filed: Mar. 8, 2013

(65) Prior Publication Data

US 2014/0258223 A1    Sep. 11, 2014

(51) Int. Cl.
*G06F 17/30* (2006.01)
(52) U.S. Cl.
CPC .... *G06F 17/30575* (2013.01); *G06F 17/30227* (2013.01); *G06F 17/30368* (2013.01)
(58) Field of Classification Search
CPC ....... G06F 1/12; G06F 11/1471; G06F 21/32; G06F 17/30575; G06F 17/30345; G06F 17/30377; G06F 17/30581; G06F 17/30067
USPC .................................................. 707/610–633
See application file for complete search history.

(56) References Cited

U.S. PATENT DOCUMENTS

| | | | | |
|---|---|---|---|---|
| 6,067,541 | A * | 5/2000 | Raju | G06F 17/30067 |
| 6,173,292 | B1 * | 1/2001 | Barber | G06F 11/1471 707/682 |
| 6,980,988 | B1 * | 12/2005 | Demers et al. | |
| 7,003,694 | B1 * | 2/2006 | Anderson, Jr. | G06F 11/2023 707/999.202 |
| 7,020,599 | B1 | 3/2006 | Cao et al. | |
| 7,734,580 | B2 | 6/2010 | Lahiri et al. | |
| 8,341,115 | B1 * | 12/2012 | Natanzon et al. | 707/613 |
| 8,423,515 | B2 | 4/2013 | Vivian et al. | |
| 8,566,326 | B2 | 10/2013 | Hu et al. | |
| 8,589,361 | B2 | 11/2013 | Hu et al. | |
| 8,615,578 | B2 | 12/2013 | Hu et al. | |

(Continued)

OTHER PUBLICATIONS

Oracle, "Replication Benefits", Library Version 12.1.6.1.*

(Continued)

*Primary Examiner* — Michelle Owyang
(74) *Attorney, Agent, or Firm* — Vista IP Law Group, LLP; Peter C. Mei (57) ABSTRACT

A method, system, and computer program product for adaptive high-performance database redo log synchronization. The method commences upon performing a write operation of a redo log entry, the write operation concluding with an indication of completion of the write operation of the redo log entry. Any number of committing processes may be waiting for the indication of completion, and upon indication of completion, then (using a first synchronization mode) the processes or proxy measures the waiting time as experienced by the committing processes (e.g., while waiting for the indication of completion of the write operation of the redo log entry). In some cases a second synchronization mode would introduce less latency than the first synchronization mode, so the system changes to a second synchronization mode. The system can also change mode when a predicted second mode waiting time is smaller than the measured waiting time.

20 Claims, 8 Drawing Sheets

(56) References Cited

U.S. PATENT DOCUMENTS

| | | | |
|---|---|---|---|
| 8,768,890 B2* | 7/2014 | Burchall | G06F 11/1471 707/649 |
| 8,806,264 B2 | 8/2014 | Kampouris et al. | |
| 8,838,919 B2 | 9/2014 | Shi et al. | |
| 8,868,492 B2 | 10/2014 | Garin, Jr. et al. | |
| 2005/0187891 A1* | 8/2005 | Johnson | G06F 11/2097 |
| 2007/0226277 A1* | 9/2007 | Holenstein et al. | 707/204 |
| 2008/0071925 A1* | 3/2008 | Leighton et al. | 709/241 |
| 2008/0228834 A1* | 9/2008 | Burchall | G06F 11/1471 |
| 2010/0036861 A1 | 2/2010 | Srihari et al. | |
| 2012/0323849 A1* | 12/2012 | Garin et al. | 707/617 |
| 2014/0059020 A1 | 2/2014 | Hu et al. | |
| 2014/0095530 A1 | 4/2014 | Lee et al. | |
| 2014/0095553 A1 | 4/2014 | Panteleenko et al. | |
| 2014/0164331 A1 | 6/2014 | Li et al. | |
| 2014/0196055 A1 | 7/2014 | Hu et al. | |
| 2014/0258224 A1 | 9/2014 | Song et al. | |
| 2014/0279917 A1 | 9/2014 | Minh et al. | |

OTHER PUBLICATIONS

Microsoft Corporation, "Microsoft Computer Dictionary,—5$^{th}$ ed.", Personal Web Server, per-pixel lighting, 2002, 2 pages.

* cited by examiner

ADAPTIVE HIGH-PERFORMANCE DATABASE REDO LOG SYNCHRONIZATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of high-availability database systems and more particularly to techniques for adaptive high-performance database redo log synchronization.

BACKGROUND

One way to ensure the atomicity of certain transactions in a database is to delay writing the results of any one operation to a database until all of the operations in the "atomic" transaction have been deemed successful. Then a "commit" operation is performed, and all of the operations in the "atomic" transaction are written to persistent storage. This practice is often used in mission-critical and/or commercially important situations in combination with performance of logging—where all or most all operations performed on a database are logged to a "redo log" for later replay or redo. In some cases transaction logging is used in combination with other high-integrity and/or high-availability techniques. One such combination involves write-ahead logging (WAL). Write-ahead logging, when used in combination with synchronized commit operations, can guarantee that no changes are committed to disk until such time as the corresponding redo log records are confirmed to have been written. Used in this manner, write-ahead logging ensures the atomicity and durability components of the "atomic", "consistent", "isolated" and "durable" (ACID) properties favored in database systems. However, write-ahead logging introduces latency during transaction commit because a committing process must wait for (1) the redo log write to complete, and must further wait for (2) receipt of a success indication from the redo log writer.

In database management systems, this redo log write synchronization can be accomplished by using a "post-wait" technique or by using a "poll-wait" technique. A post-wait technique uses the interrupt mechanism of the underlying operating system, while a poll-wait technique uses a memory access and compare. In most situations the cost for a process to perform a single "post-sleep-wait-resume-continue" series of operations is more expensive than a single "poll-continue" operation. Comparing the two, post-wait and poll-wait each offer differing advantages and disadvantages under different circumstances depending on the system, the system configuration, and the aggregate processing of work on the system. Generally, post-wait offers lower latency when only a single process or few processes are trying to commit a transaction. And, generally, poll-wait techniques scale better as the number of committing processes increases.

Legacy techniques are deficient in that a selected synchronization technique might have been appropriately selected at the time of selection and deployment, however system configurations and workloads change over time, in fact, system configurations might change quite substantially, even in a relatively short period of time.

Moreover, none of the aforementioned technologies have the capabilities to perform the herein-disclosed techniques for adaptive high-performance database redo log synchronization. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for adaptive high-performance database redo log synchronization.

Disclosed herein are systems and computer implemented methods for adaptive high-performance database redo log synchronization. The method commences upon performing a write operation of a redo log entry, the write operation concluding with an indication of completion of the write operation of the redo log entry. Any number of committing processes may be waiting for the indication of completion, and upon indication of completion, then (using a first synchronization mode) the processes or proxy measures the waiting time as experienced by the committing processes (e.g., while waiting for the indication of completion of the write operation of the redo log entry). In some cases a second synchronization mode would introduce less latency than the first synchronization mode, so the system changes to a second synchronization mode. The system can also change mode when a predicted second mode waiting time is smaller than the measured waiting time.

Some embodiments are configured to switch between a first synchronization mode being a post-and-wait mode (hereafter "post-wait" mode) and second synchronization mode being a poll-to-detect mode (hereafter "poll-wait" mode). In such embodiments the system might initially establish a post-wait mode. And foreground processes (e.g., processes performing database transactions and committing such transactions) use the established post-wait mode to wait for confirmation of safe storage of a redo log entry corresponding to a database transaction. Another process (e.g., a performance monitor) serves for determining a processing latency incurred by waiting for confirmation of safe storage of a redo log entry. As further database transactions are performed, and as further redo log entries are written, the waiting time is continuously measured, and (for example) when in the post-wait mode, the measured waiting time is compared to an expected poll-wait mode waiting time. When the computed expected poll-wait mode waiting time is smaller than the measured waiting time, then switch the mode to poll-wait. In some cases the reverse is true, and a second-selected synchronization mode begins to introduce more latency than the first-selected synchronization mode, so the system changes back to the first-selected synchronization mode.

Other predictive techniques can be used. For example, some embodiments predict improvement and respond to the predicted improvement by changing a mode indication value to the post-wait sense when enough of the committing processes operating in poll-wait mode are predicted to see improvement if they were to be switched to the post-wait regime.

To limit fast switching between modes, a counter and an initial counter threshold can influence the rate of switching between one mode and a second mode.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing adaptive high-performance database redo log synchronization. More particularly, disclosed herein and in the accompanying figures are exemplary environments, methods, and systems for implementing adaptive high-performance database redo log synchronization.

Overview

The methods and systems disclosed herein use one or more adaptive hybrid techniques for redo log write synchronization that seek to actively manage the latency incurred with write-ahead logging is used in combination with transaction commit techniques.

Such adaptive hybrid techniques for redo log write synchronization seek to select one or another synchronization technique. For example, some of the herein-disclosed techniques measure system parameters over recently passed moments in time and, based on the values of such system parameters, select whichever synchronization technique is predicted to minimize the latency for committing transactions that are awaiting acknowledgement indications from write-ahead logging. Strictly as an example, when there are many committing processes, a poll-wait synchronization regime is more likely to perform better than is a post-wait regime. In an alternative, when there are few committing processes, a post-wait mode is likely to perform better than a poll-wait mode. As further disclosed herein, the switching or transition from one mode to another mode is performed automatically in the face changing system conditions.

As discussed herein, the selection of a synchronization regime is automatic, and does not require user intervention to decide when or how to use either post-wait or poll-wait. Instead, embodiments continuously measure system metrics such as disk write latency, operating system scheduling delay, and redo log write synchronization latency, and uses those metrics to predict whether post-wait would result in better performance than would poll-wait. Moreover, when poll-wait is used, some embodiments evaluate an objective function using metrics from the then-current workload in order to determine a then-optimal poll-wait interval (e.g., to minimize unnecessary poll attempts while still minimizing added latency).

Additionally, when deployed in environments and/or situations having workloads with few users, optimized poll-wait intervals serve to achieve nearly the same low latency offered by post-wait (e.g., only one successful poll event, and that one successful poll occurring immediately after the redo log acknowledgement event).

As indicated above, in order to select a synchronization mode, one or more processes continuously monitor various system metrics. The following is merely a selection of such system metrics; additional metrics are discussed in later paragraphs.

1. Redo log write time. The time it takes for the log writing process to make the redo durable on disk, which includes the time for the local write (both CPU and I/O work) for the database instance and possibly a remote write to a standby database and acknowledgement across instances in a database cluster.

2. Redo synchronization time and overhead. The latency observed by the process committing the transaction. It is the sum of how long it takes the log writing process to receive the log write request, the redo log write time, and the redo synchronization overhead. The overhead is the time between the completion of the log write and the time at which the committing process detects that the log write is done, and consequently reflects the latency added by post-wait or poll-wait. Thus, the ideal redo synchronization time is the redo synchronization time minus the overhead.

3. Minimum sleep time. The underlying operating system determines the granularity at which processes can sleep. This is typically 10 milliseconds, but can be sometimes configured to 1 millisecond. A higher resolution sleep decreases the latency added by poll-wait.

4. Redo synchronization rate. The rate at which processes are committing transactions. High rates mean that it is more likely for many processes to wait on a given log write to complete. When a process commits a transaction, the log writing process may be already servicing a previous commit request. Consequently, the redo synchronization time should not exceed twice the redo log write time. To avoid poll-wait situations that waste CPU time, polling interval calculation uses a default poll-wait interval equal to twice the redo write time whenever it is decided to use poll-wait. However, if the underlying operating system's minimum sleep time is larger than this default poll-wait interval, then the minimum sleep time is used for the interval instead.

Some deployments initially operate in post-wait mode. In initial operation of this mode, each process that commits a transaction then computes the expected redo log write synchronization time that would have occurred if poll-wait had been in operation and compares it with the actual observed synchronization time (e.g., with the aforementioned default post-wait). Since it can be known what poll-wait interval would have been used, it is possible to use the observed synchronization time and the poll-wait interval in order to compute the expected number of polls, and thus the synchronization time expected from operating in a poll-wait regime. One or more processes periodically check if a significant number of the committing processes observe that poll-wait would have seen improvement (if operating under the post-wait regime) and increments a shared counter variable. Similarly, the complementary case decrements the counter (if it is a positive value). When the counter reaches a threshold positive value, the system determines to globally switch to a poll-wait regime. When switching from a post-wait regime to a poll-wait regime, the then current redo synchronization rate is stored. And, periodically after the switch, one or more processes check if the rate has dropped significantly below that value. A low synchronization rate means few processes are trying to commit, and indicates that post-wait is likely to perform better than poll-wait. Overly-frequent switches are avoided by the aforementioned counter and threshold scheme.

Returning to the discussion of calculating a polling interval, when using polling, if the interval between polling operations is too small, many poll operations might be performed before a polling operation succeeds to verify the successful storage of the write-ahead log entry, and thus unnecessarily consume CPU time. If the interval is too large, the latency will potentially be too high since a long time might have elapsed even after the successful storage of the write-ahead log entry.

One function of the herein-disclosed techniques for implementing adaptive write-ahead redo log write synchronization is to automatically and dynamically switch between using post-wait and poll-wait regimes is to maximize overall performance. Moreover, when a polling mode is entered, the herein-disclosed techniques seek to calculate and observe an optimal polling interval (e.g., to minimize measured latency).

Figure 1A:
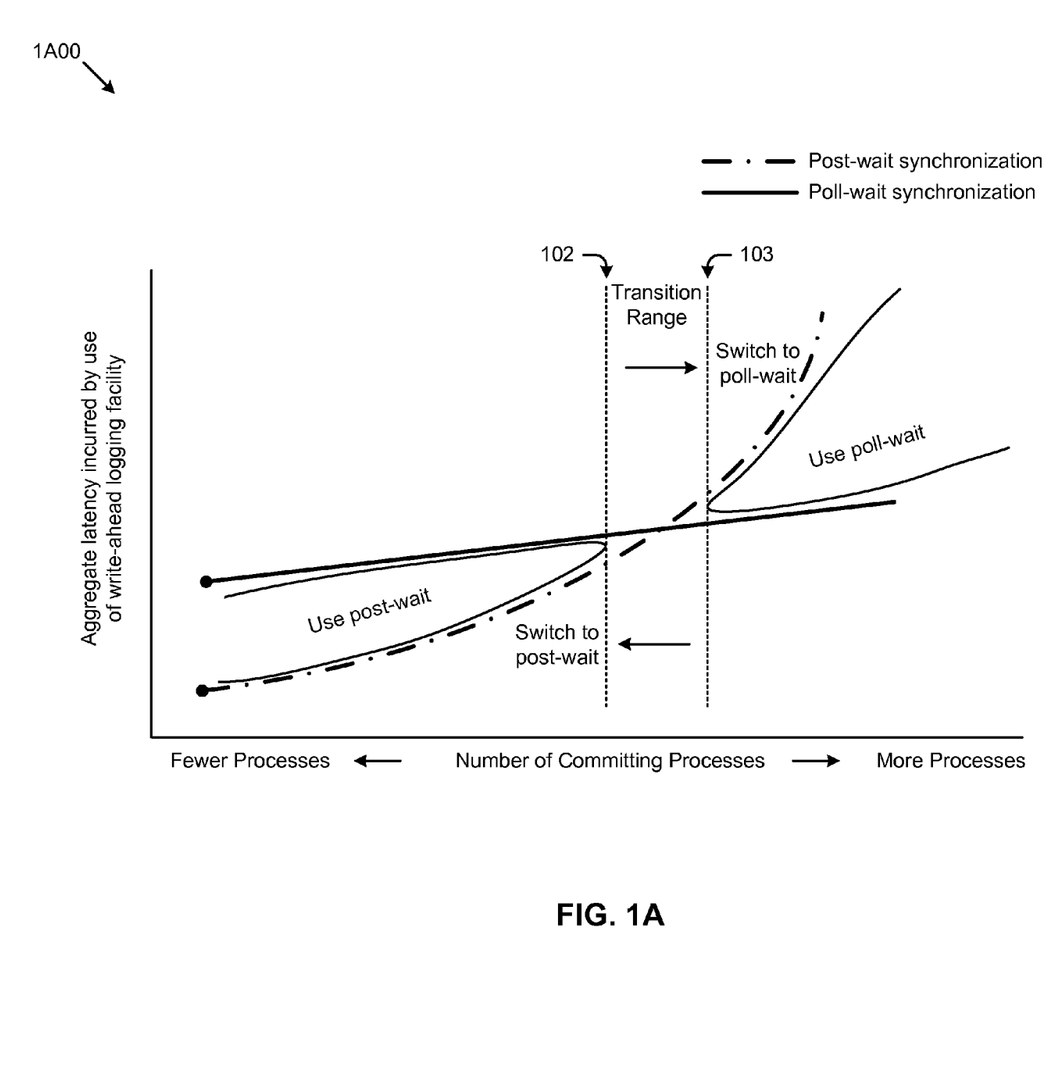
FIG. 1A is a diagram showing a crossover point between regimes used in adaptive high-performance database redo log synchronization, according to some embodiments.

A graphical depiction of a crossover point occurring when plots of a poll-wait regime and a post-wait regime are superimposed. Such a crossover point and a bounding transition range is shown in FIG. 1A. Example system, protocol, and method embodiments of adaptive high-performance database redo log synchronization are shown and discussed infra.

Definitions

Some of the terms used in this description are defined below for easy reference. The presented terms and their respective definitions are not rigidly restricted to these definitions—a term may be further defined by the term's use within this disclosure.

The term "message" refers to a communication from one entity to another entity. A message can be a packet in a networking protocol (e.g., TCP/IP), or a message can be a series of bits or bytes communicated in any known method from one entity to another entity. Accessing a memory (e.g., via a READ or a WRITE operation) is an example of a message, and may follow a protocol in so doing (e.g., DDR3 memory access protocol).

The term "logic" means any combination of software or hardware that is used to implement all or part of the embodiments of the present disclosure.

A "module" includes any mix of any portions of computer memory and any extent of circuitry including hardwired logic or circuitry embodied as a processor.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A is a diagram 1A00 showing a crossover point between regimes used in adaptive high-performance database redo log synchronization. As an option, the present diagram 1A00 may be implemented in the context of the architecture and functionality of the embodiments described herein. Also, the diagram 1A00 or any aspect therein may be implemented in any desired environment.

As shown, aggregate latency cost of a write-ahead logging facility is plotted. The two modes shown are the post-wait synchronization mode and the poll-wait synchronization mode. As the number of processes performing write-ahead logging increases, so does the aggregate system cost of performing the write-ahead logging. As depicted, the cost for using a post-wait synchronization technique increases faster than does the cost for using a poll-wait synchronization technique. Also shown is a crossover point where the cost for using a post-wait synchronization technique is equal to the cost for using a poll-wait synchronization technique. It is at or near this crossover point that adaptation occurs. More specifically, and as aforementioned, one or more processes periodically check if a significant number of the committing processes observe that poll-wait would have seen improvement (if operating under the post-wait regime) and increments a shared counter variable. It is in the range between the shown post-wait trailing edge 102 and the shown poll-wait leading edge 103 that the likelihood of incrementing (or decrementing) the shared counter variable increases.

Figure 1B:
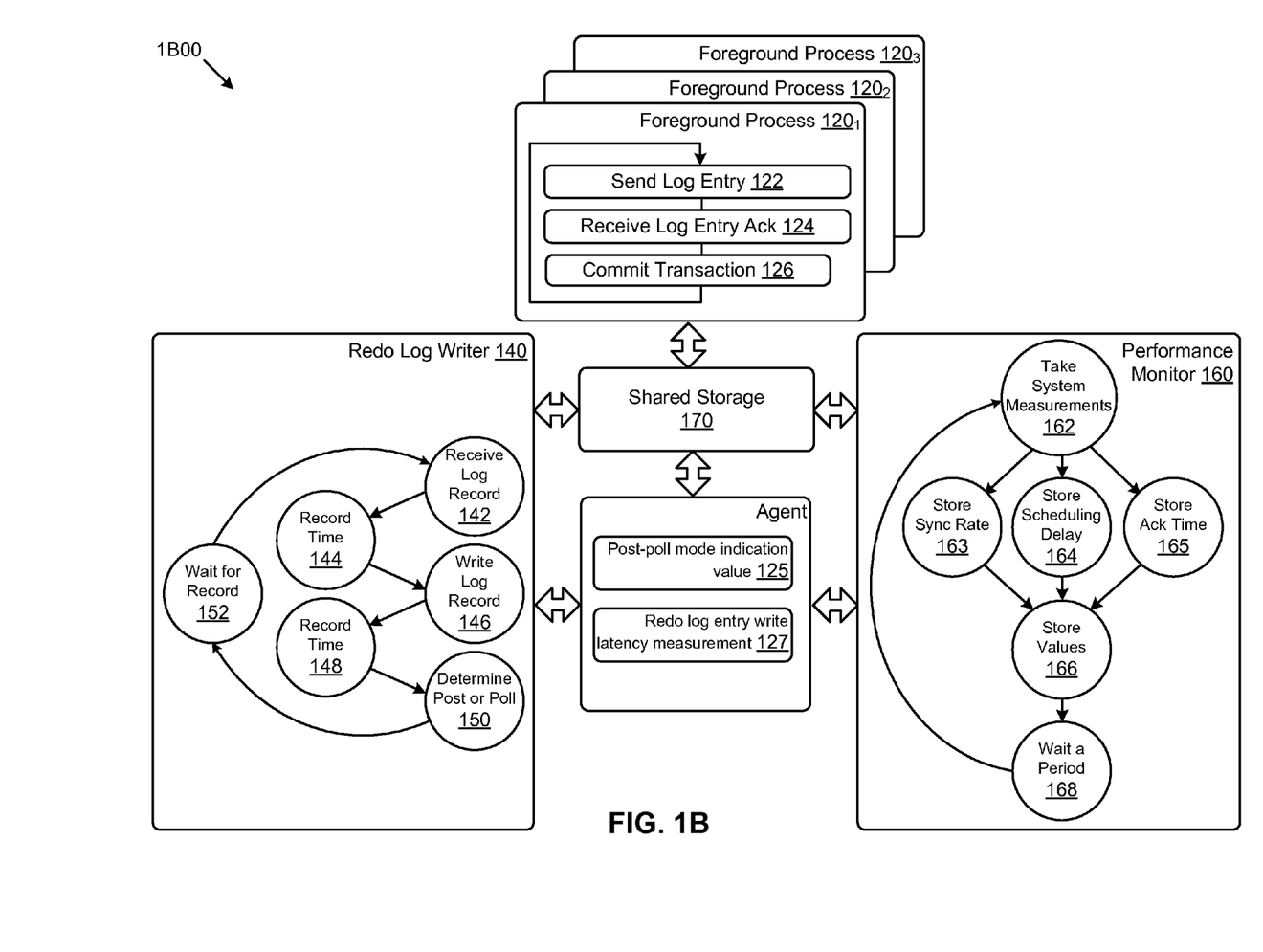
FIG. 1B is a system of interrelated processes for implementing adaptive high-performance database redo log synchronization, according to some embodiments.

FIG. 1B is a system of interrelated processes 1B00 for implementing adaptive high-performance database redo log synchronization. As an option, the present interrelated processes 1B00 may be implemented in the context of the architecture and functionality of the embodiments described herein. Also, the interrelated processes 1B00 or any aspect therein may be implemented in any desired environment.

As shown, the foreground processes (e.g., foreground processes $120_1$, foreground processes $120_2$, foreground processes $120_3$, etc.) perform various database operations, including operations to implement synchronized write-ahead logging before committing an ACID transaction. For example, the foreground processes $120_1$ sends a log entry (see operation 122) to a logging facility (e.g., redo log writer 140), and waits (e.g., using one of the aforementioned techniques of post-wait or poll-wait) until receiving an acknowledgement (see operation 124) that the logging facility has successfully written the redo log entry, then committing the transaction (see operation 126). Data items (e.g., variable values, counter values, etc.) are accessed (e.g., READ, WRITE, etc.) using one or more forms of a memory (e.g., shared storage 170). As shown, the shared storage is also accessed by the redo log writer 140 and performance monitor 160.

The redo log writer 140 implements a loop or state machine for processing operations as follows:

receive a log record comprising a redo log entry (see operation 142);

record time of receipt (see operation 144);
write the received log record (see operation 146);
record the time of write (see operation 148) and calculating (or causing to be calculated) the measured processing latency of the redo log writer (see redo log entry write latency measurement 127);
determine (or cause to be determined) post or poll mode (see operation 150);
storing the results of the post or poll mode determination (e.g., see post-poll mode indication value 125);
wait for a next record to arrive (see operation 152); and
return to processing incoming redo log entries.

The performance monitor 160 implements a loop or state machine for processing operations as follows:
take system measurements and calculate system statistics and/or convert into metrics (see operation 162);
store system metrics (see operation 163, operation 164, operation 165);
store other values, possibly calculated values based on the system metrics (see operation 166);
wait a period (see operation 168); and
again take measurements.

Figure 2A:
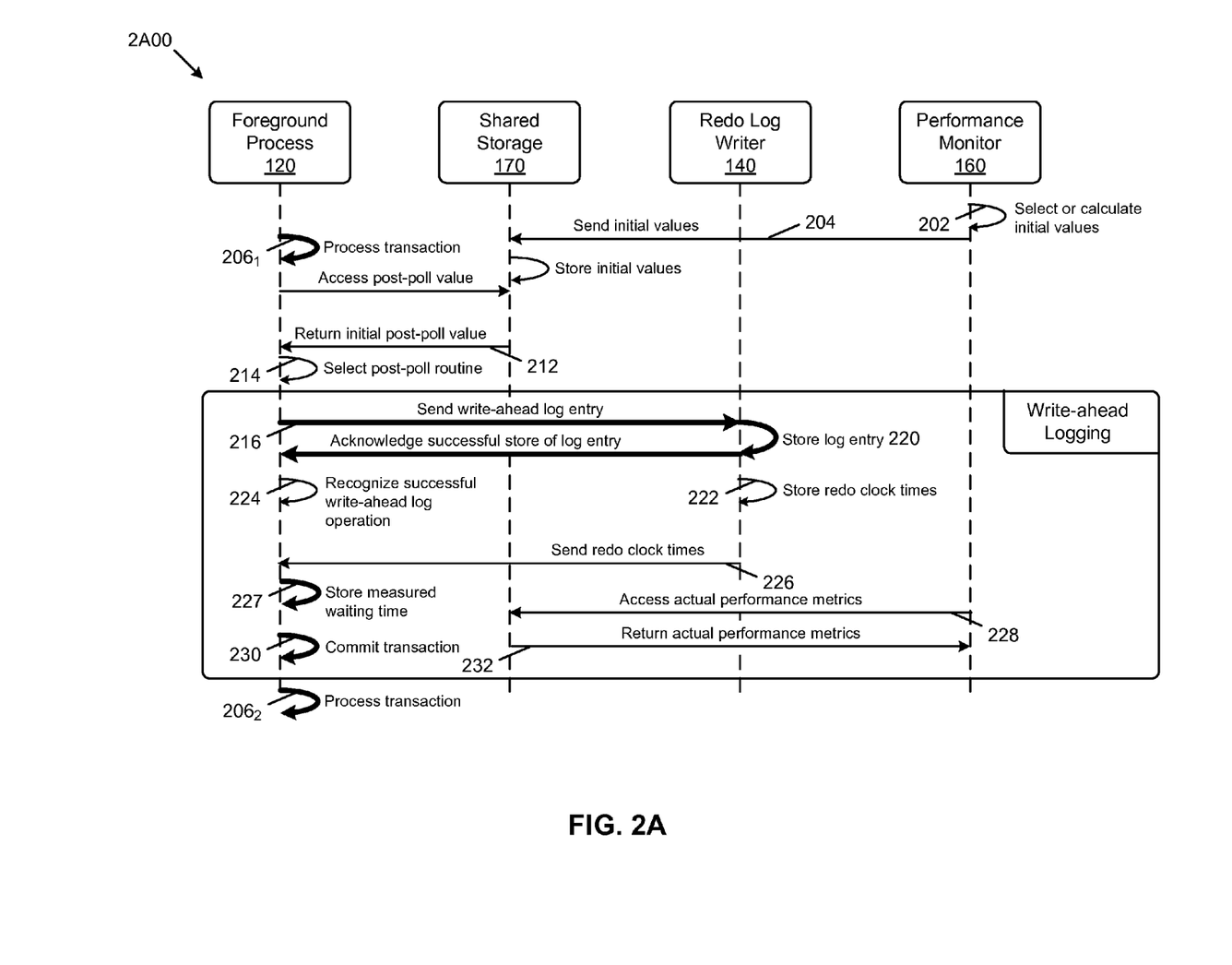
FIG. 2A exemplifies a protocol used between interrelated processes when implementing adaptive high-performance database redo log synchronization, according to some embodiments.

FIG. 2A exemplifies a protocol 2A00 used between inter-related processes when implementing adaptive high-performance database redo log synchronization. As an option, the present protocol 2A00 may be implemented in the context of the architecture and functionality of the embodiments described herein. Also, the protocol 2A00 or any aspect therein may be implemented in any desired environment.

As shown, the protocol is carried out by three agents (e.g., a foreground process 120, a redo log writer 140, and a performance monitor 160) where each of the agents can access a shared storage 170. The shared storage may be a semiconductor memory, or may be another type of memory, and access (e.g., READ, WRITE) is provided by known-in-the-art techniques.

As is earlier discussed, the write-ahead logging practice is often used in mission-critical and/or commercially important situations in combination logging of all or most all operations performed on a database, which operations are logged to a "redo log" for later replay or redo. A protocol for write-ahead logging, in combination with synchronized commit operations, is given in FIG. 2A. For example, a foreground process (see FIG. 3 for additional discussion) can process a transaction (see operation $206_1$), send the write-ahead log entry to a redo log writer (see message 216), wait for the acknowledgement of successful storage of the log entry (see message 220), and commit the operation (see operation 230).

The foregoing paragraph describes a protocol using a foreground process 120, and a redo log writer 140 communicating using a shared memory. A performance monitor 160 can be introduced into the protocol, and the performance monitor can aid in the determination to use a post-wait mode or a poll-wait mode. As shown, a performance monitor can select or calculate initial values at some early moment in time (see operation 202), and then send the initial values to shared storage (see message 204) for storage later access by an agent. For example, a foreground process might access initial values, possibly including an initial value that indicates post-wait mode or poll-wait mode (see initial post-poll value of message 212). The foreground task can then use the sense of the initial post-poll value to determine if a post-wait routine or a poll-wait routine is to be used (e.g., see operation 214) while awaiting the acknowledgement of the successful store of the write-ahead log entry.

Before committing (see operation 230) the foreground process waits for, and then receives, the acknowledgement of the successful store of the write-ahead log entry by executing a post-poll routine, which routine was earlier determined (see operation 214).

As can be understood in this protocol 2A00, the determination of whether to execute the post-wait routine or to execute the poll-wait routine is determined by the initial values as calculated by the performance monitor 160. The initial value might be a default constant, or might be determined on the basis of some calibration. For example, if the performance monitor determines that there are few committing processes on the system, it might set the initial value for post-poll mode to post-wait mode (see FIG. 1A). Or, if the performance monitor determines that there are many committing processes on the system, it might set the initial sense for the post-poll mode variable to poll-wait mode.

Once a foreground process has committed the earlier transaction (e.g., see operation $206_1$) the foreground process might proceed to execute a new transaction (e.g., see operation $206_2$). Accordingly, a system that was initially exhibiting low utilization, might become successively busier, and more and more committing processes might be executing on the system. A performance monitor can serve to monitor the performance of the redo log writer and other performance metrics, and can calculate or otherwise make determinations as to which mode to use at any given moment. For example, and as shown, the redo log writer 140 might store the entry (see operation 220) and might store the clock-time values corresponding events of a redo log write (see operation 222). In some embodiments, an operation to store a log entry (e.g., see operation 220) might be followed by timestamping event and sending a clock-time value of when the storage operation to store the redo log write entry began, and/or when the storage operation to store the redo log write entry completed (for example, see message 226).). The foreground process 120 might store a measured waiting time (see operation 227).

In some circumstances, the time elapsed between operation 220 and the recognition of a successful write-ahead log operation (see operation 224) might be in microseconds. In other situations, the time elapsed between operation 220 and operation 224 might be in milliseconds or longer.

Now, considering that actual elapsed time performance metrics are captured and stored, a performance monitor can use the empirical measurements to facilitate the determination of the post-poll mode. For example a performance monitor can access actual performance metrics from shared storage (see message 228 and message 232), which actual performance metrics can be used in calculations. Implementing a performance monitor embodied as a separate process serves to allow offload performance-related monitoring activities from any of the performance-critical processes. Still further, implementing a performance monitor embodied as a separate process serves to allow the performance monitor to execute at a lowered operating system priority.

Figure 2B:
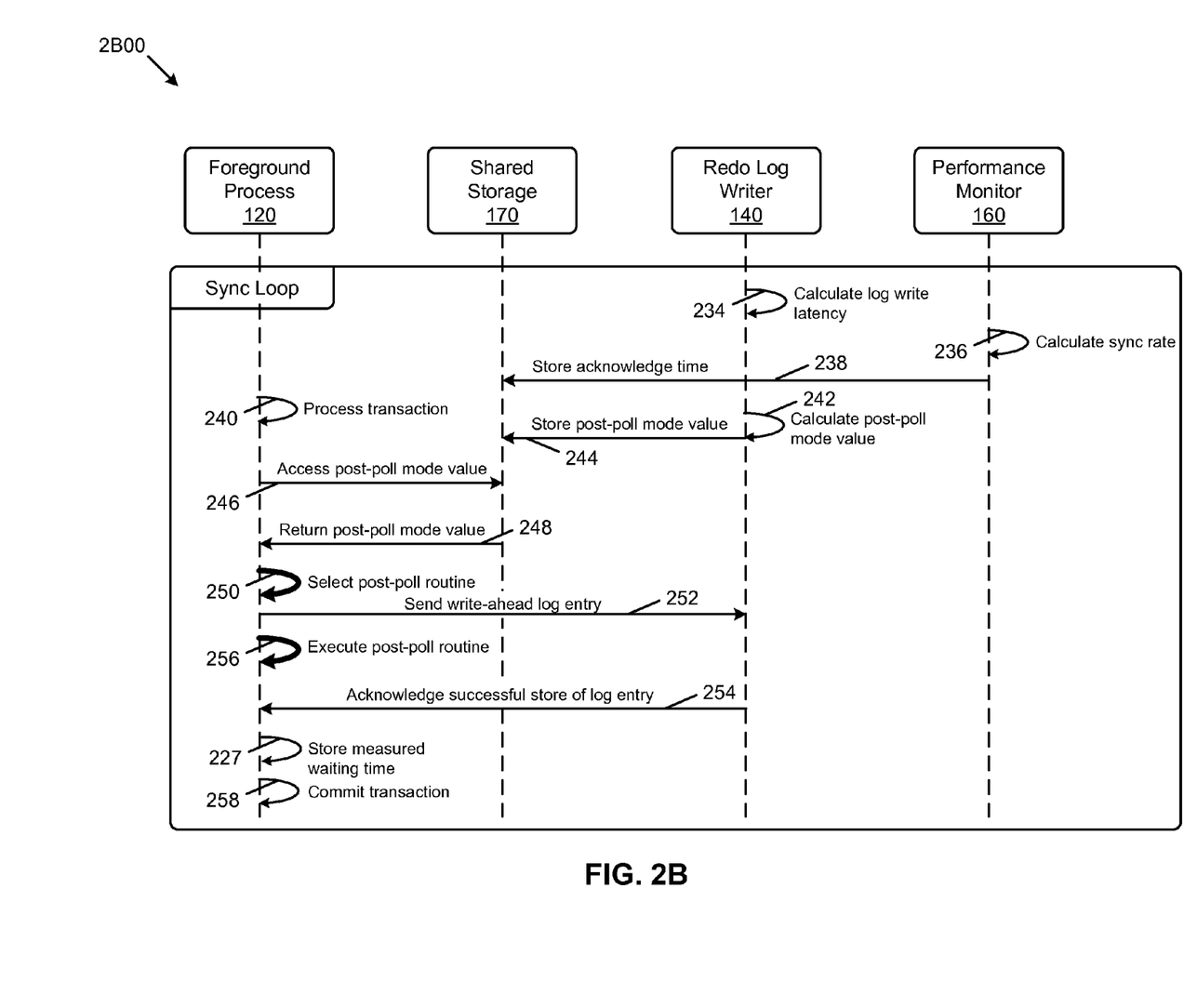
FIG. 2B exemplifies a protocol used between interrelated processes when implementing adaptive high-performance database redo log synchronization, according to some embodiments.

FIG. 2B exemplifies a protocol 2B00 used between inter-related processes when implementing adaptive high-performance database redo log synchronization. As an option, the present protocol 2B00 may be implemented in the context of the architecture and functionality of the embodiments described herein. Also, the protocol 2B00 or any aspect therein may be implemented in any desired environment.

As shown, the protocol 2B00 commences at some point after communication of message 228. The performance monitor measures and/or calculates the log write latency (see operation 234), and performs other calculations (e.g., see operation 236) to calculate a sync rate. The calculations of the performance monitor (e.g., calculations of an acknowledge time) can be stored in shared storage (see message 238), which can in turn be used by an agent to calculate a post-poll mode value. The embodiment of protocol 2B00 shows the calculation of a post-poll mode value being performed by a redo log writer (see operation 242), however, any agent can perform the calculation and store the result to shared storage (see operation 244).

Returning to an earlier discussion, a foreground process might process a transaction (see operation 240), access shared storage to retrieve a post-poll mode value (see message 246 and message 248) and use the returned value to determine the post-poll routine (see operation 250). Then, the foreground process sends the write-ahead log entry (see operation 252) and waits for the acknowledgement of a successful store of the log entry (see message 254) by executing the selected post-poll routine (see operation 256), which was selected as being responsive to a post-poll mode indication value 125 that was determined at least in part on measured system performance characteristics (e.g., as were reported by the performance monitor). The foreground process 120 might store a measured waiting time (see operation 227). Once the process has executed the selected post-poll routine, the foreground process can commit the transaction (see operation 258).

The aforementioned operations (e.g., operations of the performance monitor, or operations of the redo log writer, etc.) take system measurements and analyze and/or convert them into statistics or metrics. The calculations can encompass a wide range of system measurements. Table 1 lists some such system measurements, strictly as examples. The variable names are selected to refer to the meaning of the measured or calculated quantity.

TABLE 1

System measurement values

| Value Derivation | Comment |
| --- | --- |
| average_redo_write_time = redo_write_time/redo_writes | Can be an instantaneous average; or can be a moving average |
| average_broadcast_ack_time = redo_write_broadcast_ack_time/ redo-writes | Can be an instantaneous average; or can be a moving average |
| average_redo_synch_time = redo_synch_time/ redo_synch_writes | Nominally, this quantity is close to: 2 * (average_redo_write_time + average_broadcast_ack_time) |
| average_redo_synch_polls = redo_sync_polls/ redo_synch_poll_writes | Nominally, this quantity is close to 1 |
| fraction_of_syncs_via_polling = redo_synch_polls_writes/ redo_synch_writes | Can be an instantaneous quantity; or can be quantified as a moving average |

The system measurements and usage of Table 1 are further discussed infra.

Figure 3:
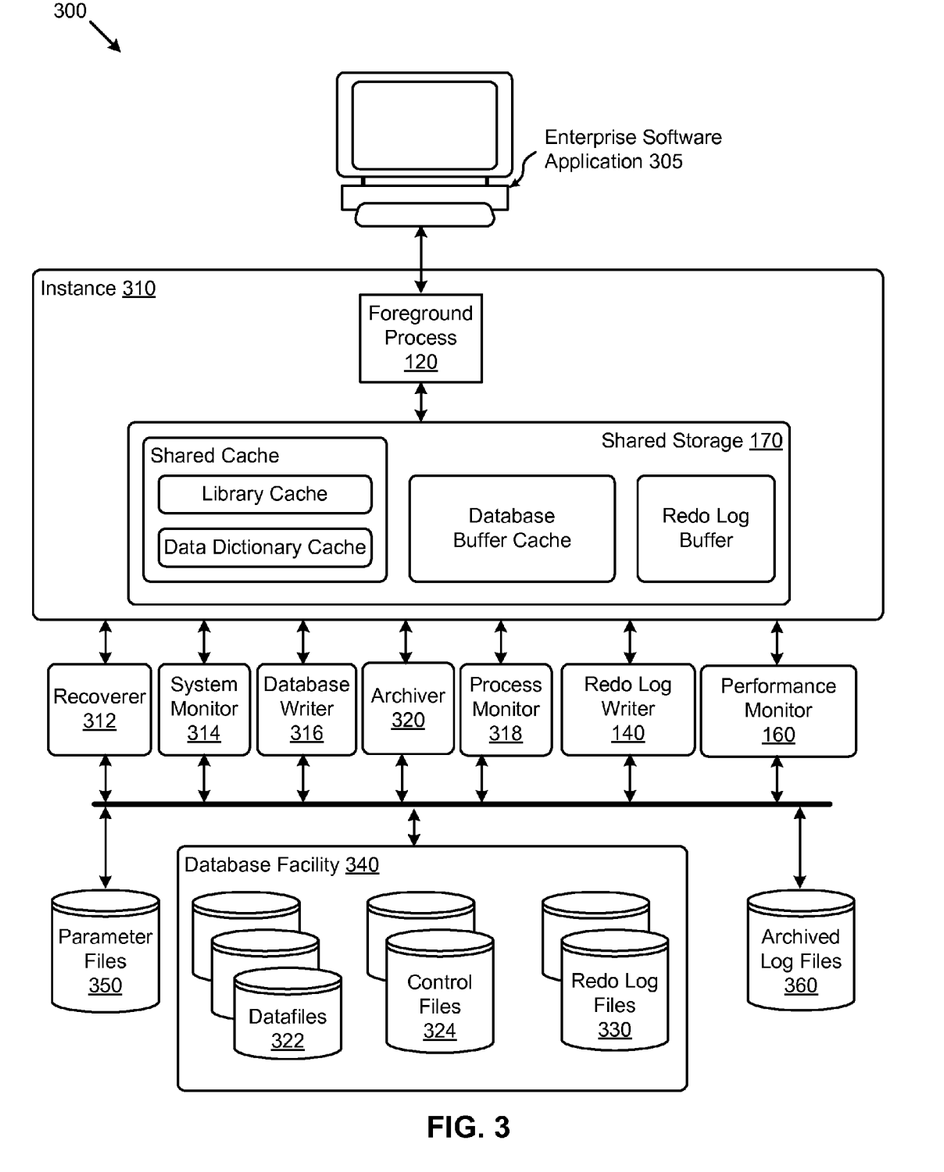
FIG. 3 exemplifies an environment suited for implementing adaptive high-performance database redo log synchronization, according to some embodiments.

FIG. 3 exemplifies an environment 300 suited for implementing adaptive high-performance database redo log synchronization. As an option, the present environment 300 may be implemented in the context of the architecture and functionality of the embodiments described herein. Also, the environment 300 or any aspect therein may be implemented in any desired environment.

The environment depicts an enterprise software application 305 in communication with an instance 310, which instance in turn hosts one or more instances of foreground process 120 and one or more instances of shared storage 170. The instance communicates with any number of processes (e.g., recoverer 312, system monitor 314, database writer 316, archiver 320, process monitor 318, redo log writer 140, performance monitor 160, etc.), which in turn communicate with a database facility 340. The database might comprise data files 322, control files 324, and redo log files 330. Additionally, the environment might support a file system, including parameter files 350 and archived log files 360).

The processes can communicate one with another (e.g., via shared memory or other techniques) and the operations of FIG. 2A and FIG. 2B can be implemented in any one or more of such processes.

Returning to the discussion of Table 1, and now referring to the exemplary environment of FIG. 3, the system parameters, system figures of merit, and various measurement and calculation techniques are briefly discussed below.

Redo Write Time and Broadcast Acknowledge Time

In exemplary cases, a redo log writer 140 writes to one or more redo log files, and the bulk of the elapsed time is spent performing I/O for various reasons. In some cases a redo log writer may wait for I/O to complete when propagating the results to one or more instances of a standby database or other instances. In a different I/O wait scenario, agents might broadcast on commit, and might need to wait on the corresponding broadcast (and other) I/O operation(s). The time spent doing the I/O and propagating it to a standby (if needed) is captured by the redo_write_time statistic, and the additional cost for broadcast on commit is measured by the redo_write_broadcast_ack_time statistic. Thus, it is possible to compute the expected log write time by summing the average of redo_write_time and redo_write_broadcast_ack_time to quantify the processing latency of a redo log writer.

Redo Synch Time

When a foreground process sends a redo log entry to a redo log writer 140 to write out the log, redo log writer 140 is often already busy doing a write. Consequently, the effective delay seen by the foreground process is one to two times the expected redo_write_time. This delay is tracked via the redo_synch_time statistic. Thus, if the redo_synch_time exceeds the expected log write time, then additional steps are taken to evaluate using poll-wait mode over post-wait mode.

Minimum Sleep Time and Sleep Overhead

The minimum sleep time is system-dependent (e.g., possibly depending on the operating system) and sets a bound on how frequently it is reasonable to wait between successive executions of a poll-wait routine in a particular process. In exemplary embodiments, at startup, the redo log writer 140 measures the minimum sleep time. The redo log writer 140 measures the overhead of the sleep measurement instrument (e.g., an API) by timing how long a call with the minimum sleep time takes. This is performed multiple times and the average measured overhead is used as the sleep overhead.

Scheduling Delay

A high scheduling delay is an indication of high system load. Empirically, post-wait performs worse than poll-wait under high system load. However, if the system load is low, then post-wait performs well and often provides better response times than poll-wait.

Referring again to FIG. 1A, the switching or transition from one mode to another mode is performed automatically in the face of rapidly changing system conditions. Switching can be accomplished using multiple processes, each performing certain operations. A possible partitioning of operations to processes, and a possible set of switching techniques, are discussed below.

Strictly as an example, a redo log writer 140 may take the decision whether to use post-wait or poll-wait for redo log write synchronization, and might communicate the results of taking this decision to the foreground processes via a variable stored in shared memory. In one embodiment, initially, a redo log writer 140 uses post-wait, and every several seconds later evaluates if the polling mode results in better performance. If a workload has several phases (e.g., perform batches, wait, perform batches, etc.), a redo log writer 140 may potentially switch between post-wait and polling multiple times. In many situations, switches between modes are recorded in a trace file with each entry having a time stamp and an identifying string (e.g., the string "Log file sync switching to: poll-wait", or "Log file sync switching to: post-wait").

Switching to Post-Wait

A redo log writer 140 can keep an exponentially-weighted moving average of the redo_write_time samples (e.g., a most recent set of N samples) for all commits requested by processes. Other performance monitoring techniques might be used in applicable cases. For example, one technique calculates an estimate of expected polling latency and compares the calculated estimate with the actual observed latency (e.g., under a post-wait scenario).

A performance monitor is used to compute the current average broadcast_ack_time. When a foreground's commit request is satisfied, it computes redo_synch_overhead, which is the difference between the time the foreground process detects that its commit is done and the time at which its redo log writer 140 completes the write. When a foreground uses polling, it picks an interval that is twice the sum of the redo_write_time and the broadcast_ack_time. Thus, using the aforementioned values, it is possible to compute the number of times the foreground process would have polled.

Continuing with this embodiment, when a foreground finishes its redo log write synchronization, it compares its actual redo synch time against the expected value if it had used polling instead. If the former is greater by at least some threshold (e.g., 10%), then the foreground increments a count of "long" redo syncs. Every few seconds, the performance monitor aggregates the number of "long" redo syncs and the total number of syncs. A redo log writer 140 compares these values (also every few seconds), and if at least a pre-determined portion (e.g., ⅛) of the syncs are long, then the redo log writer 140 will decide to use poll-wait over post-wait.

Polling Interval Selection

In exemplary embodiments, a foreground process selects the polling interval it will use. If a redo log writer 140 can service the foreground's write immediately, then the foreground sleeps for a duration equal to the sum of the average of redo_write_time plus the average of broadcast_ack_time. However, if the redo log writer 140 is already busy doing a write, then the foreground simply sleeps for longer (e.g., twice as long). The effectiveness of the polling interval selection is measured by the new redo_synch_polls statistic. For example, if the average number of polls is significantly greater than 1, then the algorithm is selecting too short of a polling interval. However, if this value is close to 1, then a more aggressive polling interval is set via an adaptive_log_file_sync_poll_aggressiveness parameter. This parameter has a default value of 0 and shortens the polling interval used by a percentage of the current scheduling delay.

Switching to Post-Wait

Just before a decision to set poll-wait mode, the agent saves the current scheduling delay and the current redo synch rate. While polling is used, the current scheduling delay and redo synch rate are compared to their respective values saved at the time of the switch. If the current scheduling delay or the current redo synch rate is less than some selected switch value, then redo log writer 140 will decide to use post-wait. Such a switch value can be adjusted at will, and such values can be stored in any persistent storage facility (e.g., in a database table) or in any other storage facility.

Frequency of Switches

Because switching between post-wait and polling incurs overhead, the algorithm uses a saturating counter to prevent overly frequent switches. When the algorithm selects a particular mode, it initializes the counter to a max value (e.g., max value of 3). Decisions favoring the current mode increments the counter, and decisions favoring the alternate mode decrements the counter. When the counter reaches 0, the agent switches the synchronization mode. Using the above values, because the agent evaluates the synchronization mode every few seconds, and if the counter has a max value such as a max value of 3, then switches cannot occur more frequently than about every 9 seconds. Finally, reducing the frequency of switches also makes the algorithm more resilient to statistical anomalies such as a single long write time.

Configuration

Strictly as examples, the aforementioned parameters can be set to defaults, and/or configuration parameters can control the behavior of a system in an environment such as environment 300. The configuration parameters are named and explained in Table 2.

TABLE 2

Configuration parameters

| Configuration Parameter Name | Explanation |
| --- | --- |
| SYNC_FLAG | TRUE: Enable adaptive log sync file synchronization (default) |
| | FALSE: Disable adaptive redo log write synchronization (i.e., just use post-wait) |
| | POLLING_ONLY: Use polling with adaptive polling interval |
| POLLING_THRESHOLD | Larger values make it harder to switch to polling |
| | Suggested default value is 110%, which means the current redo synch time must exceed the expected poll time by at least 10% for the algorithm to favor polling over post-wait |
| POSTWAIT_THRESHOLD | Smaller values make it harder to switch to post-wait |
| | Default value is 50%, which means the current scheduling delay needs to drop to half of that when polling as first used for the algorithm to favor post-wait over polling |
| POLL_AGGRESSIVENESS | Larger values result in smaller polling intervals |
| | Suggested default value is 0%, which means none |

TABLE 2-continued

Configuration parameters

| Configuration Parameter Name | Explanation |
| --- | --- |
| | of the current scheduling delay is subtracted from the polling interval |
| SCHEDULING_DELAY_WINDOW | The window over which the current scheduling delay is computed |
| | Default value is 60 seconds |
| SWITCH_FREQ_THRESHOLD | A warning is printed if adaptive redo log write synchronization switches frequently between post-wait and poll-wait |
| | Suggested threshold is 3 switches per minute |
| SYNC_FIXED_SLEEP | A non-zero value specified will use polling with a fixed interval and disable adaptive redo log write synchronization |
| POST_WAIT_SYNC_TIMEOUT | Duration that the foreground waits for a redo log writer to post when post-wait is used |
| | Suggested default value is 100 milliseconds |

Additional Embodiments of the Disclosure

Figure 4:
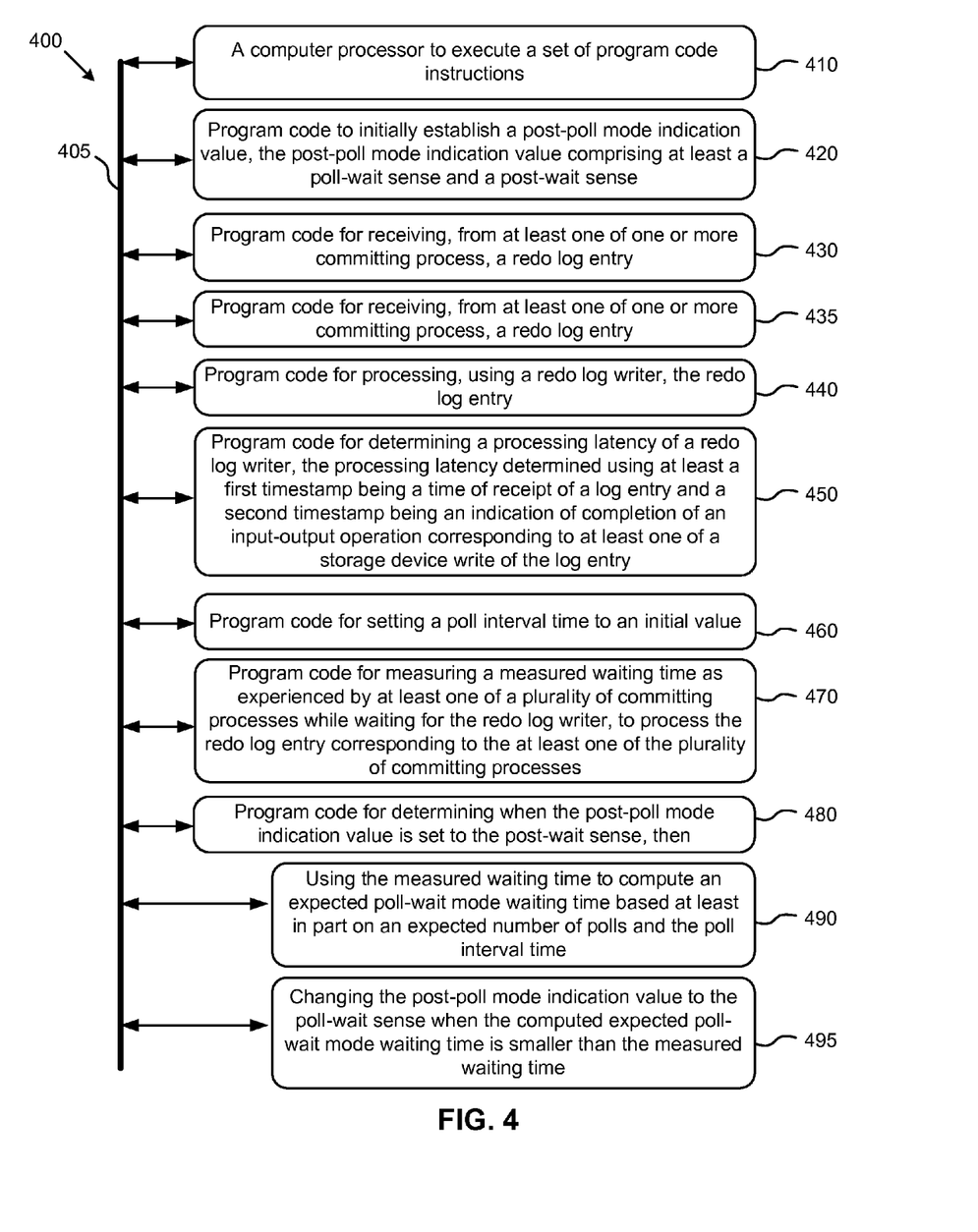
FIG. 4 is a block diagram of a poll-wait/post-wait system for adaptive high-performance database redo log synchronization, according to some embodiments.

FIG. 4 is a block diagram of a poll-wait/post-wait system for adaptive high-performance database redo log synchronization. As an option, the present system 400 may be implemented in the context of the architecture and functionality of the embodiments described herein. Of course, however, the system 400 or any operation therein may be carried out in any desired environment. As shown, system 400 comprises at least one processor and at least one memory, the memory serving to store program instructions corresponding to the operations of the system. As shown, an operation can be implemented in whole or in part using program instructions accessible by a module. The modules are connected to a communication path 405, and any operation can communicate with other operations over communication path 405. The modules of the system can, individually or in combination, perform method operations within system 400. Any operations performed within system 400 may be performed in any order unless as may be specified in the claims.

The embodiment of FIG. 4 implements a portion of a computer system, shown as system 400, comprising a computer processor to execute a set of program code instructions (see module 410) and modules for accessing memory to hold program code instructions to perform: initially establish a post-poll mode indication value, the post-poll mode indication value comprising at least a poll-wait sense and a post-wait sense (see module 420); receiving, from at least one of one or more committing process, a redo log entry (see module 430); receiving, from at least one of one or more committing process, a redo log entry (see module 435); processing, using a redo log writer, the redo log entry (see module 440); determining a processing latency of a redo log writer, the processing latency determined using at least a first timestamp being a time of receipt of a log entry and a second timestamp being an indication of completion of an input-output operation corresponding to at least one of a storage device write of the log entry (see module 450); setting a poll interval time to an initial value (see module 460); measuring a measured waiting time as experienced by at least one of a plurality of committing processes while waiting for the redo log writer, to process the redo log entry corresponding to the at least one of the plurality of committing processes (see module 470); determining when the post-poll mode indication value is set to the post-wait sense, then (see module 480); using the measured waiting time to compute an expected poll-wait mode waiting time based at least in part on an expected number of polls and the poll interval time (see module 490); and changing the post-poll mode indication value to the poll-wait sense when the computed expected poll-wait mode waiting time is smaller than the measured waiting time (see module 495).

Figure 5:
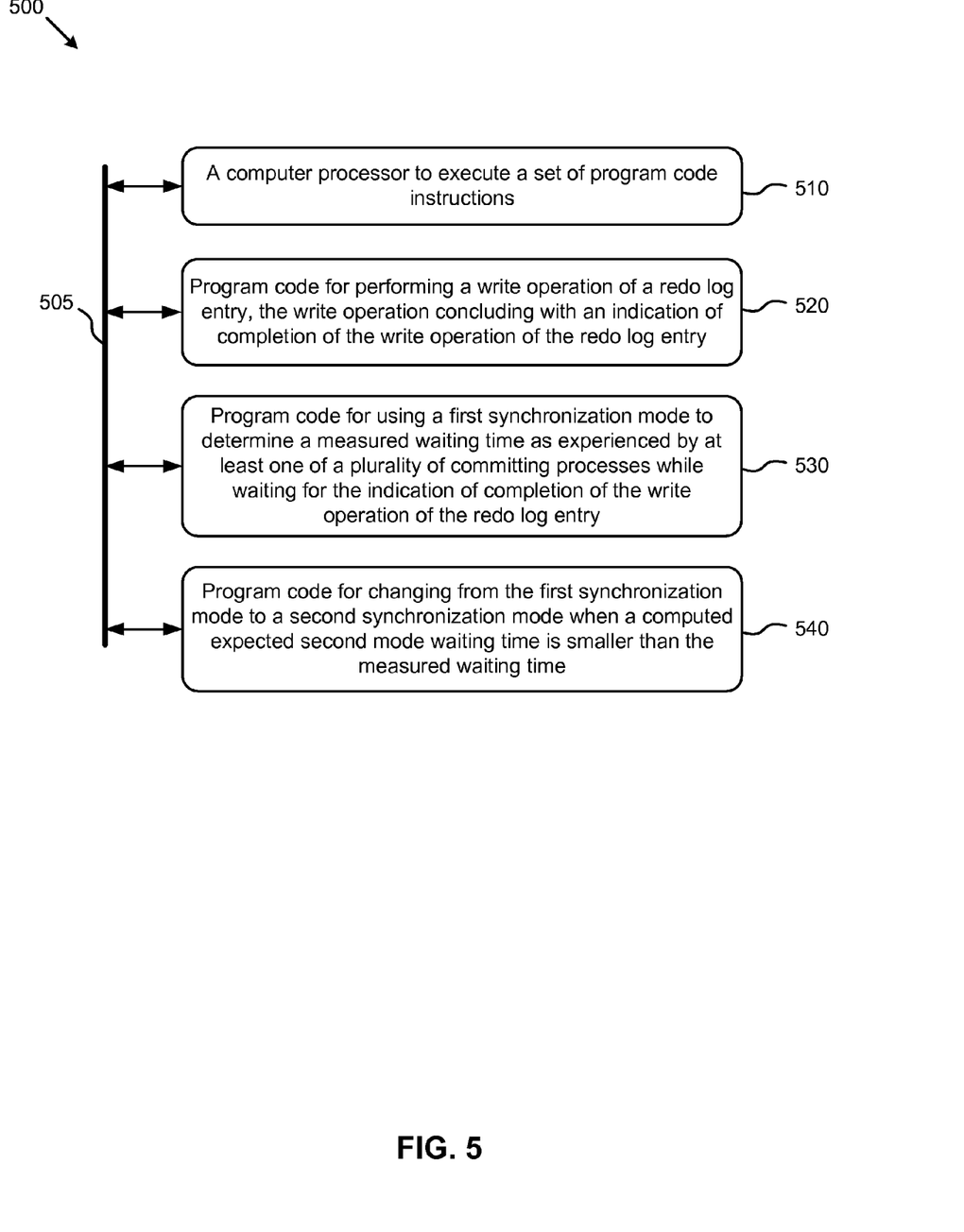
FIG. 5 is a block diagram of a system for adaptive high-performance database redo log synchronization, according to some embodiments.

FIG. 5 is block diagram of a system 500 for adaptive high-performance database redo log synchronization. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The embodiment of FIG. 5 implements a portion of a computer system, shown as system 500, comprising a computer processor to execute a set of program code instructions (see module 510) and modules for accessing memory to hold program code instructions to perform: performing a write operation of a redo log entry, the write operation concluding with an indication of completion of the write operation of the redo log entry (see module 520); using a first synchronization mode to determine a measured waiting time as experienced by at least one of a plurality of committing processes while waiting for the indication of completion of the write operation of the redo log entry (see module 530); and changing from the first synchronization mode to a second synchronization mode when a computed expected second mode waiting time is smaller than the measured waiting time (see module 540).

System Architecture Overview

Figure 6:
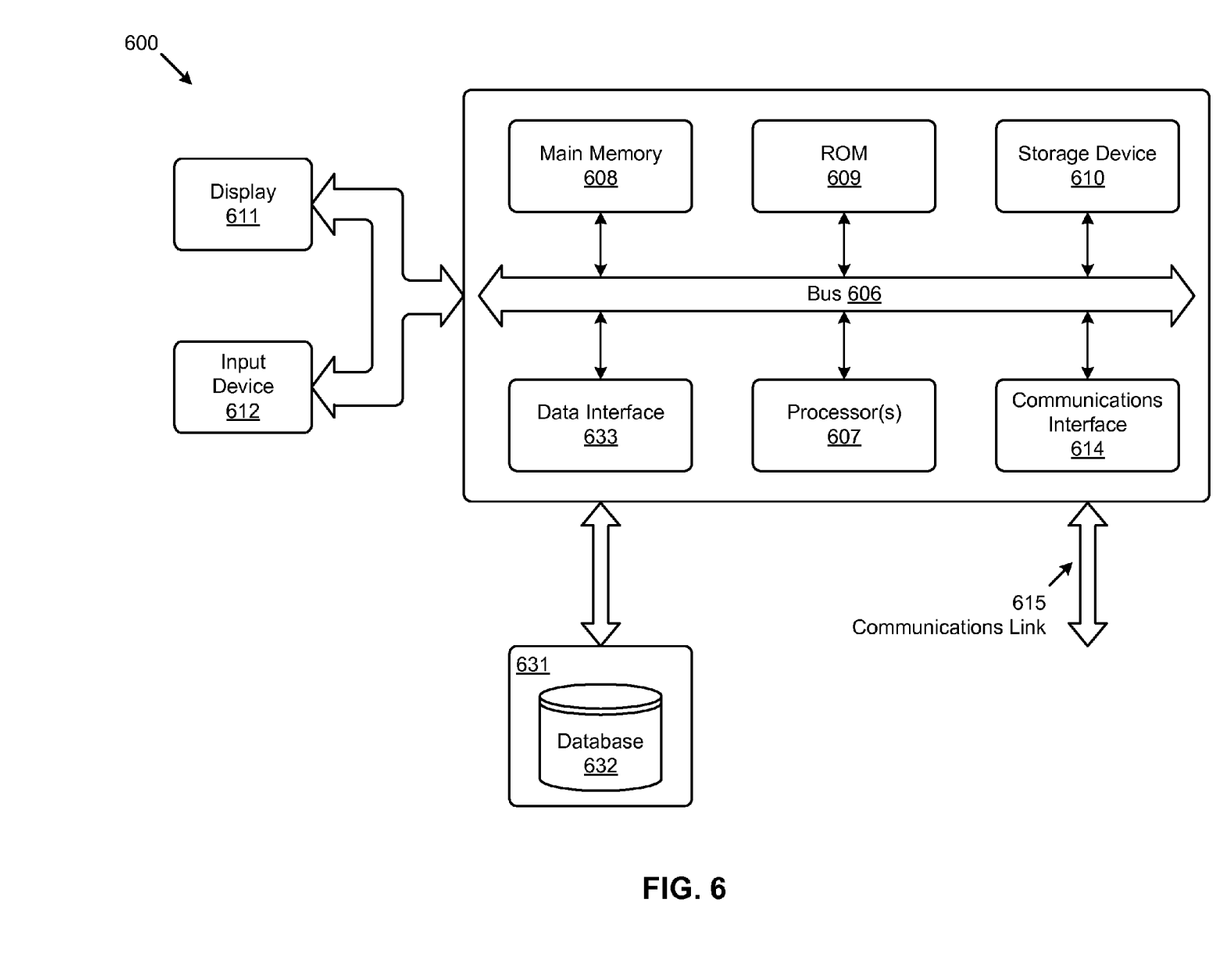
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hardwired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for adaptive high-performance database redo log synchronization, the method comprising:
    performing a write-ahead logging operation comprising a plurality of committing processes that store a number of redo log entries;
    establishing a post-poll mode indication value comprising at least a poll-wait sense and a post-wait sense wherein the poll-wait sense corresponds to a poll-wait mode, and the post-wait sense corresponds to post-wait mode;
    setting the post-poll indication value to the post-wait sense corresponding to a first synchronization mode in which the write-ahead logging operation is performed;
    in a first synchronization mode:
        determining a first measured waiting time taken by at least one committing process of the plurality of committing processes while waiting for a receipt of an indication of completion of the write-ahead logging operation that stores a redo log entry of the number of redo log entries in a persistent storage and storing the first measured waiting time in a first location of computer memory;
        computing and storing, at a latency computation module stored in the computer memory, an expected second mode waiting time that a second synchronization mode is predicted to take until the receipt of the indication of completion of the write-ahead logging operation that stores the redo log entry, wherein the expected second mode waiting time is computed based at least in part on an expected number of polls and an expected poll interval time;
        selecting between the first synchronization mode and the second synchronization mode based in part or in whole upon whether the expected second mode waiting time is smaller than the first measured waiting time, wherein the second synchronization mode is selected when the expected second mode waiting time is smaller than the first measured waiting time;
    setting the post-poll mode indication value to poll-wait sense corresponding to the second synchronization mode when the second synchronization mode is selected; and
    implementing a durability property providing no loss of data from failures in storing the number of redo log entries in the persistent storage at least by committing the write-ahead logging operation after waiting for and receiving the receipt of the indication for successful completion of storing the number of redo log entries in the persistent storage, regardless of whether the first synchronization mode or the second synchronization mode is selected to service the write-ahead logging operation.

2. The method of claim 1, wherein the first synchronization mode uses an interrupt mechanism to wait for the receipt of the indication of completion of the write-ahead logging operation.

3. The method of claim 1, wherein the expected second mode waiting time is computed based at least in part on a predicted improvement after changing from the first synchronization mode to the second synchronization mode.

4. The method of claim 1, further comprising implementing a counter and an initial counter threshold to influence a switching rate between the first synchronization mode and the second synchronization mode.

5. The method of claim 1, wherein determining the first measured waiting time comprises calculating an average of measured waiting times.

6. The method of claim 5, wherein the average of measured waiting times includes a moving average over a period of time.

7. The method of claim 1, wherein the write-ahead logging operation comprises a broadcast operation.

8. A computer system for adaptive high-performance database redo log synchronization, comprising:
- a computer processor to execute a set of program code instructions; and
- a memory storing the program code instructions which, when executed by the computer processor, cause the computer processor to:
- perform a write-ahead logging operation comprising a plurality of committing processes that stores a number of redo log entries;
- establish a post-poll mode indication value comprising at least a poll-wait sense and a post-wait sense wherein the poll-wait sense corresponds to a poll-wait mode and the post-wait sense corresponds to a post-wait mode;
- set the post-poll indication value to the post-wait sense corresponding to a first synchronization mode in which the write-ahead logging operation is performed;
- in a first synchronization mode:
  - determine a first measured waiting time taken by at least one committing process of the plurality of committing processes while waiting a receipt of an indication of completion of the write-ahead logging operation that stores a redo log entry of the number of redo log entries in a persistent storage and store the first measured waiting time in a first location of computer memory;
  - compute and store, at a latency computation module stored in the computer memory, an expected second mode waiting time that a second synchronization mode is predicted to take until the receipt of the indication of completion of the write-ahead logging operation that stores the redo log entry, wherein the expected second mode waiting time is computed based at least in part on an expected number of polls and an expected poll interval time;
  - select between the first synchronization mode and the second synchronization mode based in part or in whole upon whether the expected second mode waiting time is smaller than the first measured waiting time, wherein the second synchronization mode is selected when the expected second mode waiting time is smaller than the first measured waiting time;
- set the post-poll mode indication value to poll-wait sense corresponding to the second synchronization mode when the second synchronization mode is selected; and
- implement a durability property providing no loss of data from failures in storing the number of redo log entries in the persistent storage at least by committing the write-ahead logging operation after waiting for and receiving the receipt of the indication for successful completion of storing the number of redo log entries in the persistent storage, regardless of whether the first synchronization mode or the second synchronization mode is selected to service the write-ahead logging operation.

9. The computer system of claim 8, wherein the first synchronization mode uses an interrupt mechanism to wait for the receipt of the indication of completion of the write-ahead logging operation.

10. The computer system of claim 8, wherein the expected second mode waiting time is computed based at least in part on a predicted improvement after changing from the first synchronization mode to the second synchronization mode.

11. The computer system of claim 8, further comprising implementing a counter and an initial counter threshold to influence a switching rate between the first synchronization mode and the second synchronization mode.

12. The computer system of claim 8, wherein determining the first measured waiting time comprises calculating an average of measured waiting times.

13. The computer system of claim 12, wherein the average of measured waiting times includes a moving average over a period of time.

14. The computer system of claim 8, wherein the write-ahead logging operation comprises a broadcast operation.

15. A computer program product embodied in a non-transitory computer readable medium, the non-transitory computer readable medium having stored thereon a sequence of instructions which, when executed by a processor causes the processor to execute a set of acts to implement adaptive high-performance database redo log synchronization, the set of acts comprising:
- performing a write-ahead logging operation comprising a plurality of committing processes the stores a number of redo log entries;
- establishing a post-poll mode indication value comprising at least a poll-wait sense and a post-wait sense wherein the poll-wait sense corresponds to a poll-wait mode and the post-wait sense corresponds to a post-wait mode;
- setting the post-poll indication value to the post-wait sense corresponding to a first synchronization mode in which the write-ahead logging operation is performed;
- in a first synchronization mode:
  - determining a first measured waiting time taken by at least one committing process of the plurality of committing processes while waiting for a receipt of an indication of completion of the write-ahead logging operation that stores redo log entry of the number of redo log entries in a persistent storage and storing the first measured waiting time in a first location of computer memory;
  - computing and storing, at a latency computation module stored in the computer memory, an expected second mode waiting time that a second synchronization mode is predicted to take until the receipt of the indication of completion of the write-ahead logging operation that stores the redo log entry, wherein the expected second mode waiting time is computed based at least in part on an expected number of polls and an expected poll interval time;
  - selecting between the first synchronization mode and the second synchronization mode based in part or in whole upon whether the expected second mode waiting time is smaller than the first measured waiting time, wherein the second synchronization mode is selected when the expected second mode waiting time is smaller than the first measured waiting time;
- setting the post-poll mode indication value to poll-wait sense corresponding to the second synchronization mode when the second synchronization mode is selected; and
- implementing a durability property providing no loss of data from failures in storing the number of redo log entries in the persistent storage at least by committing the write-ahead logging operation after waiting for and receiving the receipt of the indication for successful completion of storing the number of redo log entries in the persistent storage, regardless of whether the first synchronization mode or the second synchronization mode is selected to service the write-ahead logging operation.

16. The computer program product of claim 15, wherein the first synchronization mode uses an interrupt mechanism to wait for the receipt of the indication of completion of the write-ahead logging operation.

17. The computer program product of claim 15, wherein the expected second mode waiting time is computed based at least in part on a predicted improvement after changing from the first synchronization mode to the second synchronization mode.

18. The computer program product of claim 15, further comprising implementing a counter and an initial counter threshold to influence a switching rate between the first synchronization mode and the second synchronization mode.

19. The computer program product of claim 15, wherein determining the first measured waiting time comprises calculating an average of measured waiting times.

20. The computer program product of claim 19, wherein the average of measured waiting times includes a moving average over a period of time.

* * * * *